United States Patent [19]

Mikamo

[11] Patent Number: 5,349,577
[45] Date of Patent: Sep. 20, 1994

[54] OPTICAL RECORD MEDIUM INCLUDING DATA RECORD REGION AND DIRECTORY RECORD REGION AND METHOD OF MANAGING FILE DATA

[75] Inventor: Noboru Mikamo, Tokyo, Japan

[73] Assignee: Olympus Optical Co., Ltd., Tokyo, Japan

[21] Appl. No.: 951,013

[22] Filed: Sep. 25, 1992

[30] Foreign Application Priority Data

Sep. 25, 1991 [JP] Japan .................. 3-245745

[51] Int. Cl.$^5$ ............................. G11B 7/00
[52] U.S. Cl. ..................... 369/47; 369/54; 235/454
[58] Field of Search ............. 369/32, 47–50, 369/54, 58, 59, 275.3; 235/487–488, 494, 454, 456

[56] References Cited

U.S. PATENT DOCUMENTS

| | | | |
|---|---|---|---|
| 5,091,635 | 2/1992 | Akatsuka et al. | 235/487 X |
| 5,107,481 | 4/1992 | Miki et al. | 369/58 X |
| 5,111,033 | 5/1992 | Fujita et al. | 235/487 X |
| 5,111,444 | 5/1992 | Fukushima et al. | 369/58 |

FOREIGN PATENT DOCUMENTS 63-69072  3/1988  Japan .
63-91888  4/1988  Japan .

Primary Examiner—W. R. Young
Attorney, Agent, or Firm—Stevens, Davis, Miller & Mosher

[57] ABSTRACT

An optical card having a file data record region in which a number of file data are recorded and a directory record region in which a number of directories for managing the file data are recorded. The directory includes a file name specific to file data and a track address denoting a track on which the relevant file data has been recorded. In order to change a file name, there is prepared a file name changing directory in which an old file name and a new file name are set. When the file name changing directory is processed, a directory having a file name corresponding to the old file name is retrieved and the file name of the thus retrieved directory is changed into the new file name. In this manner, the file name can be changed easily and effectively. Further, when file data is to be erased, there is prepared a file name changing directory having the file name of the relevant file data as the old file name and a special file name as the new file name. When this file name changing directory is processed, a directory having a file name corresponding to the relevant old file name is erased. In this manner the relevant file data can be erased logically.

4 Claims, 6 Drawing Sheets

FIG_1A
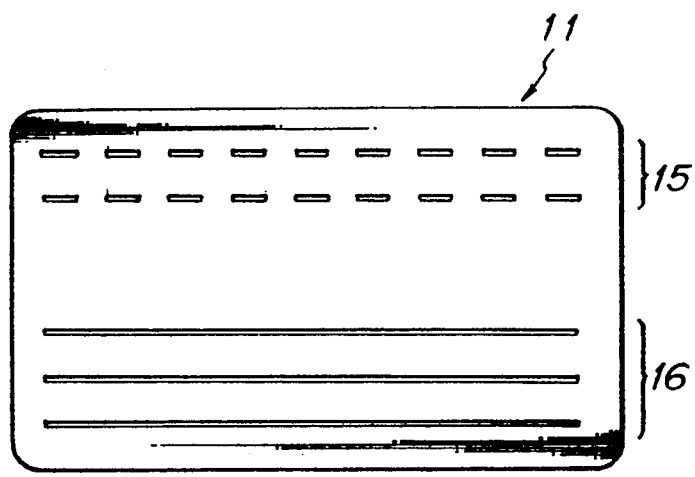
FIG_1B
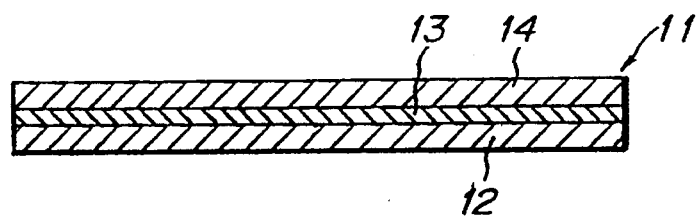

FIG_2
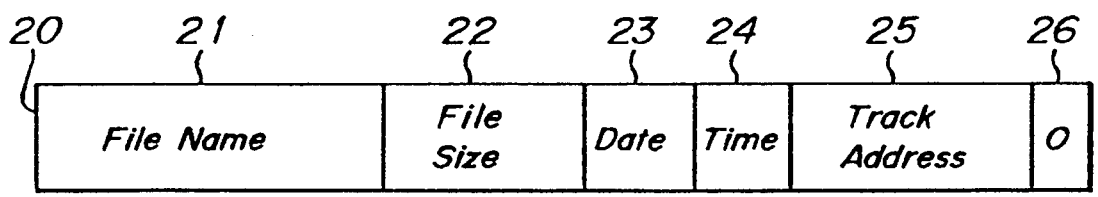
FIG_3
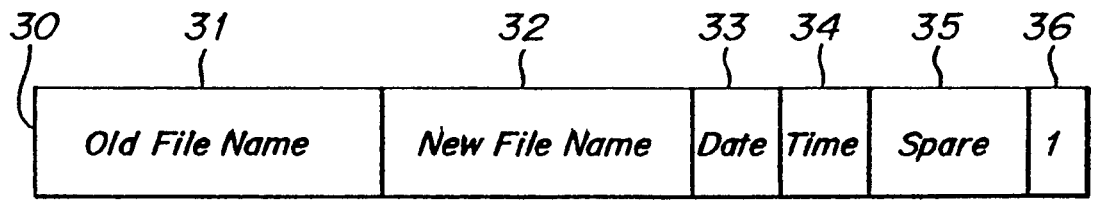

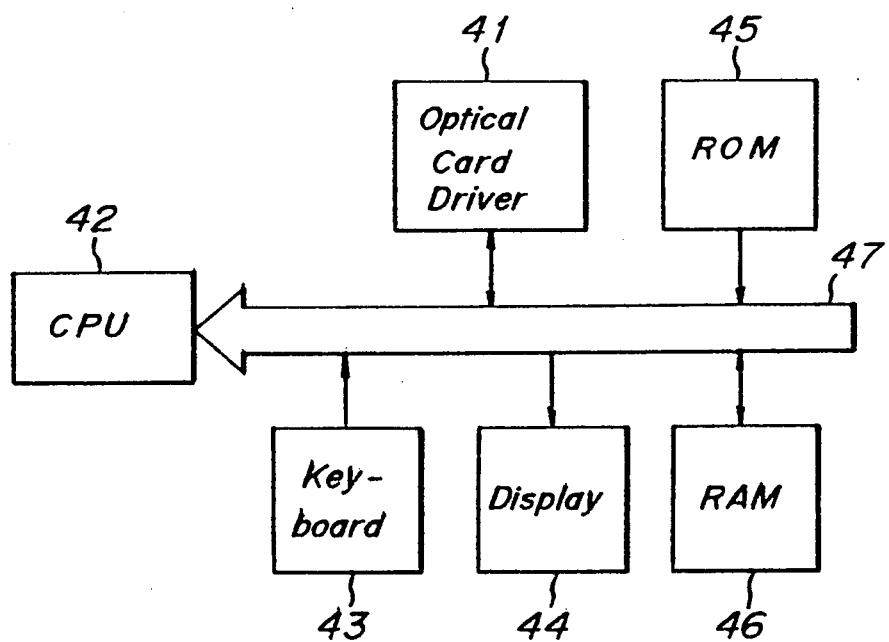
FIG_4

FIG_6
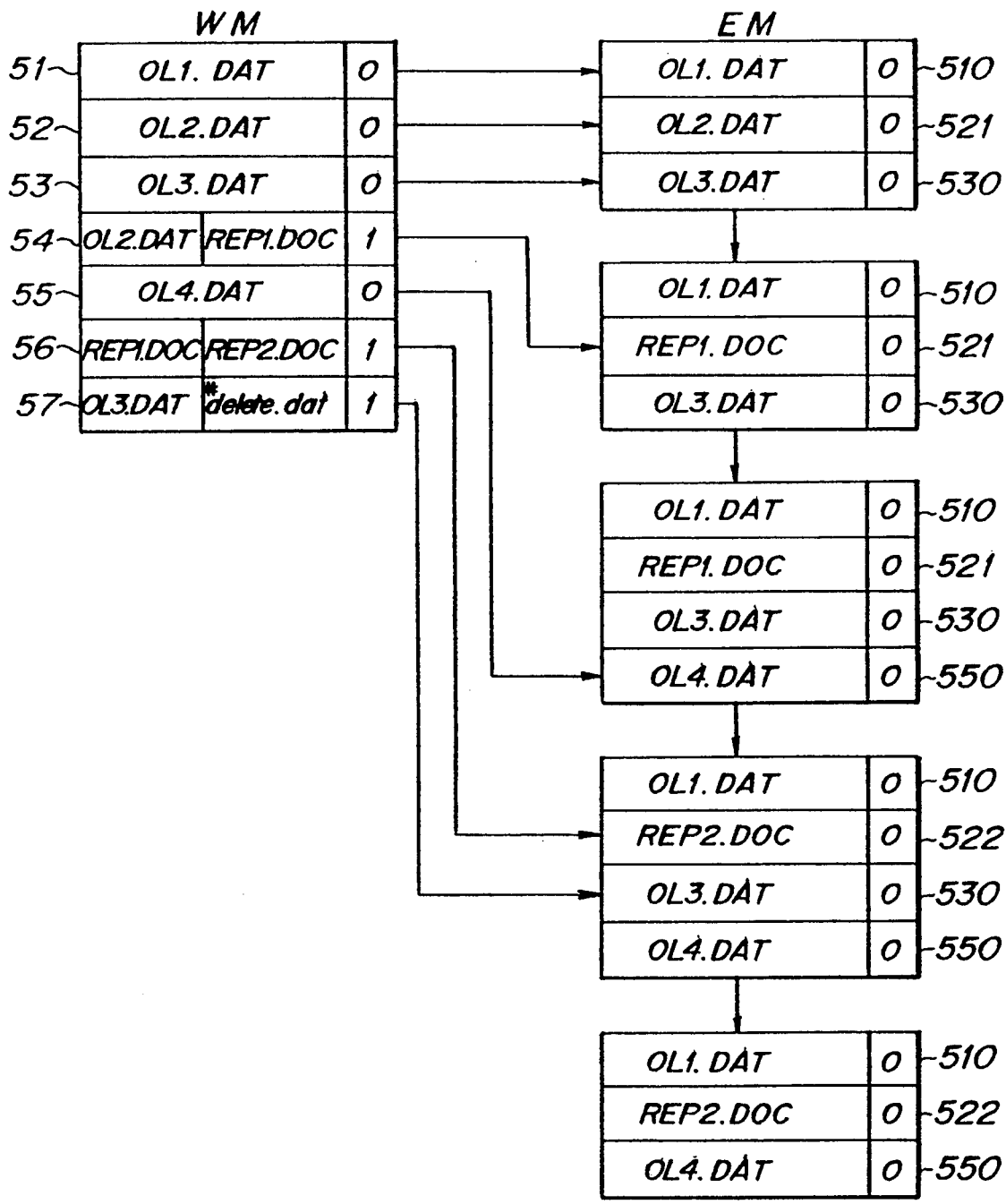

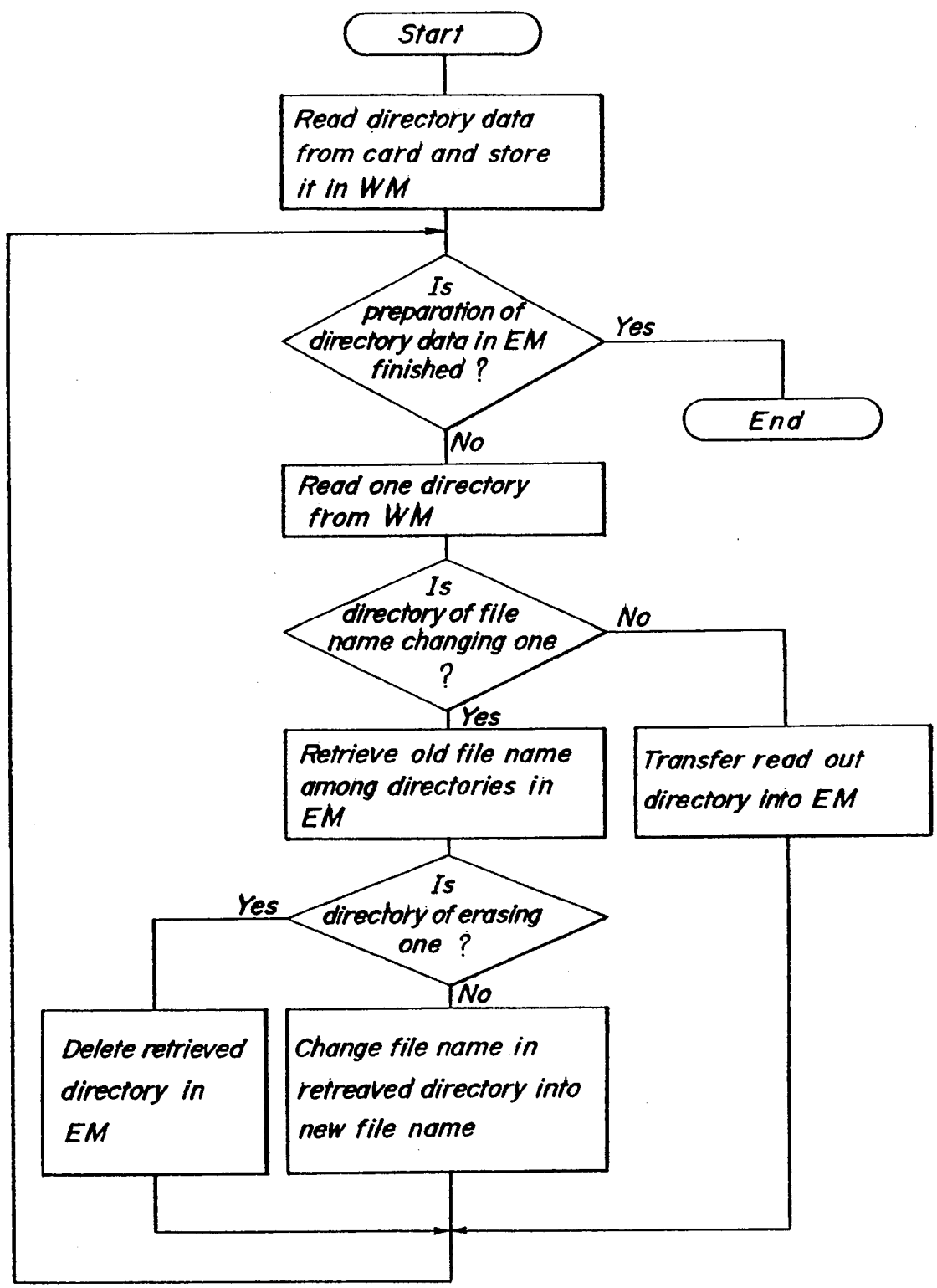
FIG_7

OPTICAL RECORD MEDIUM INCLUDING DATA RECORD REGION AND DIRECTORY RECORD REGION AND METHOD OF MANAGING FILE DATA

BACKGROUND OF THE INVENTION

1. Feidl of the Invention

The present invention relates to an optical record medium such as an optical card having a data record region in which a number of file data are record or to be recorded and a directory record region in which a number of directories for managing the file data recorded in the data record region is recorded.

2. Description of the Related Art

Heretofore, in order to manage a large amount of file data recorded on record medium such floppy disk and magnetic hard disk, there is used a directory. On a record medium there are provided a data record region and a directory record region, and the file data is recorded in the data record region and the directory is recorded in the directory record region. The directory is used as an index of file data and contains various management data such as file name, file size, a track address denoting a track on which the relevant file data has been recorded, and date and time on and at which the relevant file data and directory are recorded on the optical disk. When new data file is formed, a new directory is prepared. Further, when a file name is to be changed, a current file name recorded in a corresponding portion of a directory is rewritten into a new file name in case of using an erasable record medium.

However, in case of using an non-erasable type or write-once type optical card as the record medium, it is impossible to rewrite contents of the directory, so that the file name could not be changed directly. In Japanese Patent Publications Kokai Sho 63-69072 and 63-91888, there are proposed a method of erasing the directory logically. In the known method, there is provided an erase flag area in the directory and and when a bit 1 is recorded in the erase flag section, the directory is erased logically.

In the above mentioned known method of erasing the directory, when a file name is to be changed, at first file data denoted by the relevant file name is logically erased by providing the erase flag of "1" bit. Then, the relevant file data is recorded on a new information track in the data record region and a new directory having a new file name and a new track address is recorded in the directory region. In this manner, in the known optical card, the change of the file name requires a cumbersome operation and the data record region could not be utilized efficiently. That is to say, when the file name is changed three times, the same file data has to be recorded on three different tracks in the data record region.

SUMMARY OF THE INVENTION

The present invention has for its object to provide a novel and useful optical record medium in which a file name can be rewritten easily without wasting the data record region.

According to the invention, an optical record medium comprises:
a base;
record layer provided on the base;
a protection layer applied on the record layer;
a data record region provided in the record layer, file data being recorded in said data record region; and
a directory record region provided in said record layer, a directory for managing the file data and having file data managing data including at least a file name and an address of file data in the data record region being recorded in said directory record region; wherein said directory includes an area for denoting that a file name is changed logically.

In a preferable embodiment of the optical record medium according to the invention, in the directory record region there is provided a file name changing directory in which an old file name and a new file name are recorded side by side.

The present invention also relates to a method of managing file data recorded in an optical record medium.

According to the invention, a method of managing file data recorded in an optical record medium comprises:
recording file data on a track in a data record region in the optical record medium;
preparing an ordinary directory including at least a file name specific to said file data recorded in the data region, a file size denoting a size of the relevant file data and a track address denoting the track on which the relevant file data is recorded;
preparing a file name changing directory including at least an old file name and a new file name;
recording said ordinary directory and file name changing directory in the directory record region in the optical record medium;
reading all normal directories and file name changing directories out of the directory record region in the optical record medium;
storing the thus read out directories in a memory;
changing an old file name contained in an ordinary directory stored in the memory by a new file name contained in a corresponding file name changing directory in which said old file name and new file name are recorded;
entering a file name of file data to be read out of the data record region;
retrieving a directory having a file name corresponding to said entered file name out of the directories stored in the memory;
reading a track address in the retrieved directory; and
reading file data recorded on a track denoted by said track address contained in the retrieved directory.

In the method according to the invention, one or more file names in the ordinary directories stored in the memory are changed by one or more new file names, and the retrieving operation is carried out for the thus changed directories stored in the memory, so that the change of the file name can be performed easily in an entirely same manner as in the case of using the floppy disk and magnetic hard disk. Further, the file data whose file name is changed is not necessarily recorded again in the date record region, so that the change of the file name can be performed without wasting the date record region.

BRIEF DESCRIPTION OF THE DRAWINGS

FIGS. 1A and 1B are plan and cross sectional views, respectively showing an optical card according to the invention;

FIG. 2 is a schematic view illustrating a format of an ordinary directory;

FIG. 3 is a schematic view representing a format of a file name changing directory;

FIG. 4 is a block diagram depicting a data processing system using an optical card according to the invention;

FIG. 6 is a schematic view showing the operation of logically changing the file name; and FIG. 7 is a flow chart explaining the directory processing operation.

DESCRIPTION OF THE PREFERRED EMBODIMENTS

Figure 5:
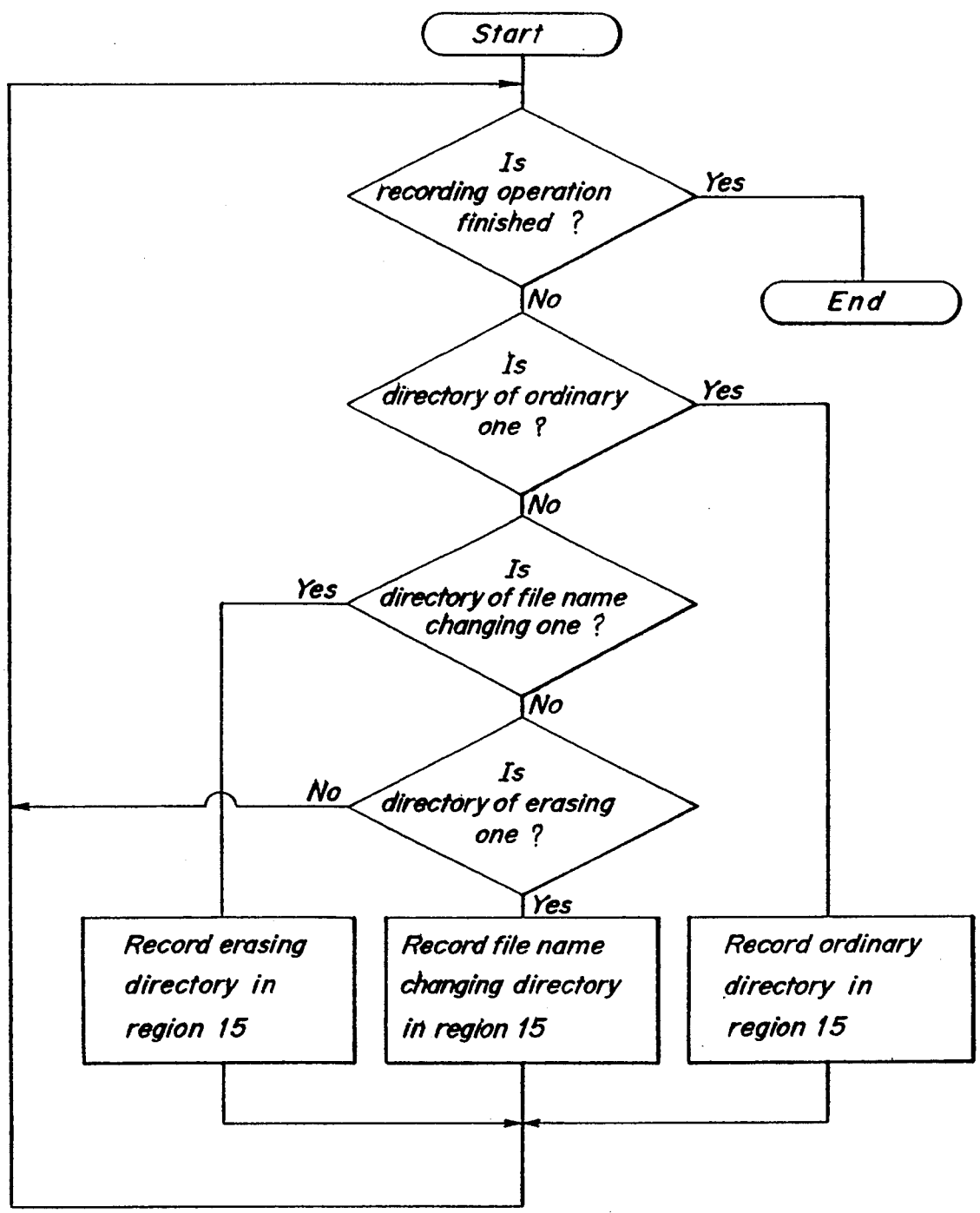
FIG. 5 is a flow chart representing the date recording operation.

FIGS. 1A and 1B are plan and sectional views, respectively showing an embodiment of the optical record medium according to the invention. In the present embodiment, the optical record medium is constructed in the form of the optical card. An optical card 11 comprises a sheet-like base 12, a record layer 13 applied on the base and a protection layer 14 applied on the record layer. The base 12 is made of synthetic resin having a low reflecting coefficient and the record layer 13 is formed by a thin metal film having a high reflecting coefficient. When a focussed laser beam is made incident upon the record layer 13, it is locally fused to form a small hole and the underlying base 12 is exposed through the hole. Therefore, in the optical card, once recorded data could not be erased, but data can be recorded in an area in which data has not been recorded before, so that the optical card is usually called a write-once type record medium.

As shown in FIG. 1A, in the optical card 11 there are provided a directory record region 15 and a data record region 16. In the directory record region 15, each single track is divided into two sectors and in the data record region 16 each single track forms one sector. In the data record region 16 there are recorded a number of file data and in the directory record region 15 there are recorded a number of directories each of which includes directory data for managing respective file data recorded in the data record region 16.

FIG. 2 shows a format of an ordinary directory recorded in the directory record region 15 in the optical card 11. When file data is recorded on a track in the data record region 16, an ordinary directory for managing the relevant file data is prepared and is recorded in the directory record region 15. An ordinary directory 20 includes several record areas 21 to 26. A file name specific to the relevant file data recorded in the data record region 16 is recorded in a first area 21, a file size denoting a size of the relevant file data is recorded in a second area 22, a date and a time on and at which the relevant file data is recorded in the optical card are recorded in third and fourth areas 23 and 24, respectively and a track address denoting a track in the data record region 15 on which the relevant file data has been recorded is recorded in a fifth area 25. In a sixth area 26 there is recorded a directory attribute for representing the attribute of the relevant directory. In a usual recording, the directory attribute flag is set to "0".

FIG. 3 is a schematic view illustrating a format of a file name changing directory which is recorded in the directory record region 15 when a file name of file data recorded in the data record region 16 is to be changed into a new file name. A file name changing directory 30 also includes a plurality of areas 31 to 36. In a first area 31 an old or current file name is recorded and in a second area 32 a new file name is recorded. In this manner, in the present embodiment, the old file name and new file name are recorded side by side in the file name changing directory 30. A date and a time on and at which the file name is changed are recorded in third and fourth areas 33 and 34, respectively. A fifth area 35 is provided as a spare area. In the file name changing directory 30, a directory attribute flag of "1" is recorded in a sixth area 36.

In the optical card 11 of the present embodiment, the above mentioned ordinary directories 20 and file name changing directories 30 are recorded in the directory record region 15 such that the directories appearing successively are recorded successively, so that directories of two different kinds are mixedly existent in the directory record region 15.

FIG. 4 is a block diagram depicting a whole construction of a data processing apparatus using the above explained optical card as the record medium. The data processing apparatus may be constructed by various units which are well known in the art, so that the detailed construction of these units is dispensed with. The data processing apparatus comprises an optical card driver 41 which includes card carrying mechanism, laser light source and optical head, a central processing unit (CPU) 42, keyboard 43, display 44, read-only memory (ROM) 45, random access memory (RAM) 46 and data bus 47 through which all the units are connected to CPU 42. In ROM 45, there is stored various kinds of commands and programs for operating the whole apparatus.

Now the operation of recording file data and a directory related thereto will be explained with reference to a flow chart illustrated in FIG. 5.

After an preparation for recording new file data on a track in the data record region 16 in the optical card 11 has been completed, a file name specific to the relevant file data is entered by means of the keyboard 43 to prepare an ordinary directory 20. The file size, date and time and address data of the track on which the relevant file data has been recorded are automatically provided. Then, a file data registrating operation is carried out in a usual manner under the control of CPU 42 to record the file data in the data record region 16 and the ordinary directory 20 in the directory record region 15 of the optical card 11.

When it is required to logically erase file data recorded in the data record region 16 in the optical card 11, a file name changing directory 30 is prepared and a predetermined special file name is set as the new file name in the area 32. It should be noted that in the first area 31 there is set the file name of the relevant file data to be erased. Then, the thus prepared file name changing directory 30 is recorded in the directory record region 15 in the optical card 11. As will be explained later, when the special file name is set in the second area 32 of the file name changing directory 30, it is logically judged that the relevant file data has been erased.

When a file name of file date recorded in the data record region 16 in the optical card 11 is to be changed, a file name changing directory 30 containing the old file name and new file name is prepared, and is then recorded in the directory record region 15 in the optical card 11.

The above explained operation is repeated until all necessary file data and directory data have been recorded in the optical card 11.

Next the operation for reading the data recorded in the directory record region 15 of the optical card 11 will be explained in detail.

Under the control of CPU 42, the whole data recorded in the directory record region 15 is first read out of the optical card 11 installed in the optical card driver 41 and the thus read out directory data is stored in a work memory provided in RAM 46. FIG. 6 illustrates the directory data thus stored in the work memory WM. For the sake of the simplicity, in FIG. 6 the ordinary directory and file name changing directory are shown to include only file names and directory attributes. That is to say, a first directory 51 in the work memory WM is an ordinary directory having a file name of "OL1.DAT" and a directory attribute of "0", and a second directory 52 also belong to an ordinary directory which includes a file name, "OL2.DAT" and a directory attribute flag of "0". A fourth directory 54 is a file name changing directory having an old file name, "OL2.DAT", a new file name, "REP1.DOC" and a directory attribute flag of "1". A sixth directory 56 is also a file name changing directory having an old file name, "REP1.DOC" and a new file name, "REP2.DOC". Since this old file name is set in the file name changing directory 54, it is recognized that the file name is changed again. According to the invention, it is possible to change the file name by any desired number of times. A seventh directory 57 is a file name changing directory, but in this directory the special file name of "#delete.dat" is set in the second area, so that this directory functions to logically erase file data having a file name, "OL3.DAT".

Now the operation for processing the directory data will be explained with reference to a flow chart shown in FIG. 7.

After the whole directory data recorded in the directory record region 15 in the optical card 11 has been read out of the optical card 11 and stored in the work memory WM, the first directory 51 is read out of the work memory and is checked whether this directory is of the file name changing directory or not. Since the first directory 51 is the ordinary directory, it is stored in an effective data storing memory EM in RAM 45 as depicted in FIG. 6. The directory stored in EM is denoted by a reference numeral 510. Similarly the second and third directories 52 and 53 are stored in the effective data storing memory EM, because these directories also belong to the ordinary directory. These directories in EM are represented by 520 and 530, respectively.

The fourth directory 54 has the directory attribute flag of "1", so that it is judged to belong to the file name changing directory, and then the old file name, "OL2.DAT" is retrieved in the directories 510, 520 and 530 stored in the effective data storing memory EM. In the present example, the second directory 520 has the relevant file name, "OL2.DAT", so that this directory is retrieved. Then, it is checked whether the relevant file name changing directory 54 is used as the file data erasing directory or not. The fourth directory 54 is judged to be not used as the file data erasing directory, because the new file name is not the special file name allocated to the erase. Then the file name, "OL2.DAT" in the second directory 520 in EM is changed into the new file name set in the fourth directory 54, i.e. "REP1.DOC". In FIG. 6, the directory whose file name has been changed is denoted by 521.

Then, the fifth directory 55 in the work memory WM is processed. Since this directory belongs to the ordinary directory, it is stored in the effective data storing memory EM as a directory 550. Next the sixth directory 56 stored in the work memory WM is read out and is checked. This directory is of the file name changing directory, so that a directory having the old file name set in this directory 56 is retrieved among the directories 510, 521, 530 and 550 stored in the effective data storing memory EM. As illustrated in FIG. 6, the second directory 521 in the memory EM has the corresponding file name, "REP1.DOC", so that this directory is retrieved. Then, the file name in the directory 521 is changed into the new file name, "REP2.DOC" set in the sixth directory 56 in the work memory WM. This directory in the effective data storing memory EM is represented by 522.

Finally, the seventh directory 57 stored in the work memory WM is read out and is checked. Since the directory attribute flag in this directory 57 is set to "1" it is judged that the relevant directory belongs to the file name changing directory. Then, a directory having the old file name, "OL3.DAT" in the directory 57 is retrieved among the directories 510, 522, 530 and 550 stored in the effective data storing memory EM. As the result of the retrieving, the third directory 530 in the memory EM is retrieved. Then the new file name in the seventh directory 57 is checked. The new file name is the specific file name for denoting the erasing the relevant file data. Then, the third directory 530 in the effective data storing memory EM is erased and the fourth directory 550 is shifted into the third memory position as illustrated in FIG. 6.

In the manner explained above, in the effective data storing memory EM there is formed effective directory data and any effective file data can be retrieve in a usual manner. That is to say, when file data having the file name, "REP2.DOC" is to be read out of the optical card 11, this file name is entered by means of the keyboard 43 and is stored in RAM 46. Then, the entered file name is retrieved among the directories stored in the effect data storing memory EM. That is to say, the second directory in the memory EM is retrieved. Then, the track address in this directory is read out and the file data recorded in the relevant track is read out of the data record region 16 in the optical card 11 under the control of CPU 42. The thus read out file data is then displayed on the display 44. In this manner, any desired file data can be read out of the optical card 11. In this case, the directory data of the file data which has been logically erased or whose file name has been changed is not stored in the effective data storing memory EM, and thus the management of the file data can be performed effectively in an entirely same manner as in the case in which the erasable floppy disk or magnetic hard disk is used as the record medium although the write-once type optical card is used.

The present invention is not limited to the embodiment explained above, but many modifications and alternations may be conceived by those skilled in the art within the scope of the invention. For instance, in the above embodiment, the directory attribute is represented by "0" and "1", but it may be set by any desired value. Further, in the above embodiment, in the file name changing directory the old file name is recorded in the first area and the new file name is recorded in the second area, but the new file name may be set in the first area and the old file name may be recorded in the second area. Moreover, the specific file name denoting the erase may be set to any desired file name. In the above embodiment, the erasing operation is carried out by using the file name changing directory, but according to the invention the erasing may be effected by utilizing an erasing directory.

As explained above in detail, according to the invention, there is provided the file name directory in addition to the normal directory, and the old file name and new file name are set in the file name changing directory together with the directory attribute, and therefore the file name can be changed effectively and easily. Further by allocating the specific file name to the file name changing directory, it is possible to logically erase file data.

What is claimed is:

1. A method of managing file data recorded in an optical record medium comprising:

recording file data on a track in a data record region in the optical record medium;

preparing an ordinary directory including at least a file name specific to said file data recorded in the data region, a file size denoting a size of the relevant file data and a track address denoting the track on which the relevant file data is recorded;

preparing a file name changing directory including at least an old file name and a new file name;

recording said ordinary directory and file name changing directory in a directory record region in the optical record medium;

reading all ordinary directories and file name changing directories out of the directory record region in the optical record medium;

storing the thus read out directories in a memory;

changing an old file name contained in an ordinary directory stored in the memory by a new file name contained in a corresponding file name changing directory in which said old file name and new file name are recorded;

entering a file name of file data to be read out of the data record region;

retrieving a directory having a file name corresponding to the entered file name out of the directories stored in the memory;

reading a track address in the retrieved directory; and reading file data recorded on a track denoted by said track address contained in the retrieved directory.

2. A method according to claim 1, wherein said ordinary directories and file name changing directories read out of the directory record region are once stored in a work memory, when a directory to be processed belongs to the ordinary directory, the ordinary directory is stored in an effective data storing memory, when a directory to be processed is of the file name changing directory, a directory having a file name which corresponds to an old file name contained in the relevant directory is retrieved, then the file name in the retrieved directory is changed into a new file name contained in the relevant file name changing directory, and a directory among the directories stored in the effective data storing memory is retrieved in accordance with the entered file name.

3. A method according to claim 2, wherein the directory stored in the work memory is judged by checking a directory attribute contained therein.

4. A method according to claim 2, wherein when file data is to be erased logically, a file name changing directory is prepared, in which a special file name is set as a new file name, and when said special file name is detected, a directory in the effective data storing memory having a file name which corresponds to an old file name in said file name changing directory is deleted.

* * * * *